United States Patent
Tomihashi et al.

(10) Patent No.: US 6,376,647 B1
(45) Date of Patent: *Apr. 23, 2002

(54) FLUOROPOLYMER POWDER AND PROCESS FOR PREPARING THE SAME

(75) Inventors: Nobuyuki Tomihashi; Toshio Miyatani, both of Osaka (JP)

(73) Assignee: Daikin Industries Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,529

(22) PCT Filed: Apr. 23, 1997

(86) PCT No.: PCT/JP97/01393

§ 371 Date: Oct. 21, 1998

§ 102(e) Date: Oct. 21, 1998

(87) PCT Pub. No.: WO97/40089

PCT Pub. Date: Oct. 30, 1997

(30) Foreign Application Priority Data

Apr. 24, 1996 (JP) ............................................. 8-102150

(51) Int. Cl.$^7$ ................................................. C08T 3/12

(52) U.S. Cl. .................... 528/502 R; 264/117; 264/118; 264/121; 264/127; 526/242; 526/250; 528/480; 528/481

(58) Field of Search ................................ 526/242, 250; 264/117, 118, 121, 127; 528/480, 481, 502

(56) References Cited

U.S. PATENT DOCUMENTS 3,983,200 A * 9/1976 Browning ................... 264/117
4,363,900 A * 12/1982 Shimizu et al. ................ 526/83
5,296,113 A * 3/1994 Lunewsky ............. 204/157.15

FOREIGN PATENT DOCUMENTS

| EP | 0 272659 | 6/1988 |
| EP | 0773244 | 5/1997 |
| GB | 740054 | 11/1955 |
| GB | 1 496966 | 1/1978 |
| JP | 36256 | 3/1976 |
| JP | 51-36256 | 3/1976 |
| JP | 11296 | 4/1978 |
| JP | 270740 | 11/1988 |
| JP | 63-270740 | 11/1988 |
| JP | 202329 | 7/1992 |
| JP | 112690 | 5/1993 |
| JP | 5-112690 | 5/1993 |
| JP | 034820 | 2/1996 |
| JP | 8-34820 | 2/1996 |

* cited by examiner

Primary Examiner—David W. Wu
Assistant Examiner—Tanya Zalukaeva
(74) Attorney, Agent, or Firm—Birch, Stewart, Kolasch & Birch, LLP

(57) ABSTRACT

Process for producing fluorine-containing polymer powder which comprises densifying fluorine-containing polymer raw powder with rolls under conditions for permitting its specific gravity to achieve at least 90% of the true specific gravity, then comminuting the densified material, removing fine particles in the range of 3 to 40% by weight of the whole particle size distribution of the comminuted material by air classification, and further removing by classification coarse particles in the range of 1 to 20% by weight of the whole particle size distribution of the comminuted material. Powder can be used as a powder paint which is excellent in productivity, in powder fluidity, and which does not generate pollution upon heat-fusion.

12 Claims, 1 Drawing Sheet

FLUOROPOLYMER POWDER AND PROCESS FOR PREPARING THE SAME

This application is the national phase under 35 U.S.C. §371 of prior PCT International Application No. PCT/JP97/01393 which has an International filing date of Apr. 23, 1997 which designated the United States of America, the entire contents of which are hereby incorporated by reference.

FIELD OF THE INVENTION

The present invention relates to fluorine-containing polymer powder utilizable in powder coating etc. and a process for producing the same.

RELATED ARTS

Fluorine-containing polymer powder can be used as a powder paint. In order to obtain a processed and coated film having a smooth surface from a powder paint, particles of the powder paint should be high in apparent density, nearly spherical in particle shape and excellent in fluidity. In a method where a powder paint is obtained from fluorine-containing resin by a mechanical comminution method, it was considered that pellets obtained in a melting extruder are easily made fibrous, and it is difficult to obtain an excellent powder paint even by freeze-comminution. A method of obtaining an emulsification polymerization-type dispersion by a spray dry method requires enormous facilities and high costs, and its productivity is low.

In a process for producing transparent tetrafluoroethylene copolymer powder disclosed in Japanese Patent Kokoku Publication No. 11296/1978, the powder after classification cannot be recycled as powder for powder paint, so its productivity is not good.

For improving apparent density and fluidity by heating, there is a method of obtaining an aqueous dispersion by spray-drying as described in Japanese Patent Kokoku Publication No. 11296/1978, but the facilities used therein are enormous and costs for the facilities are also high. Further, a method of separating and crushing powder which was heat-fused by heat treatment for a long time at a temperature ranging from the fusion-initiating temperature to the melting point of a copolymer, as described in Japanese Laid-Open Patent Publication No. 202329/1992, makes use of heat treatment by a batch furnace on a metal vessel (tray) or an indirect heating-type rotary kiln etc., but due to the heat-fusion of the powder, metal pollution occurs at a position where the powder is in contact with the metal, so the product is not preferable for uses in semiconductor industry.

Powder after polymerization and drying of fluorine-containing polymer powder often forms aggregated fine powder or ball-shaped granulated powder having a diameter of more than 1 mm by suspension solvent, so uniform powder particles cannot be obtained in many cases, and it is known that an extruded strand obtained by a kneader is cut into pellets which are then pulverized to give powder for powder coating. However, the fine powder obtained by comminuting the pellets is fibrous particles due to strong stress at the time of comminution, so the powder suffers from the problems of low apparent density and poor powder fluidity.

SUMMARY OF THE INVENTION

The object of the present invention is to provide fluorine-containing polymer powder which can be used as a coating powder that is excellent in productivity, is excellent in powder fluidity, and does not generate pollution upon heat-fusion, as well as a process for producing the same.

The present invention provides a process for producing fluorine-containing polymer powder which comprises densifying fluorine-containing polymer raw powder with rolls under conditions for permitting its specific gravity to achieve at least 90% of the true specific gravity, then comminuting the densified material, removing fine particles in the range of 3 to 40% by weight of the whole particle size distribution of the comminuted material by air classification, and further removing coarse particles in the range of 1 to 20% by weight of the whole particle size distribution of the comminuted material by classification.

The present invention also provides a process for producing fluorine-containing polymer powder which comprises densifying fluorine-containing polymer raw powder with rolls under conditions for permitting its specific gravity to achieve at least 90% of the true specific gravity, then comminuting the densified material, removing fine particles in the range of 3 to 40% by weight of the whole particle size distribution of the comminuted material by air classification, further removing coarse particles in the range of 1 to 20% by weight of the whole particle size distribution of the comminuted material by classification, and conducting heat-treatment at a temperature of not less than the fusion-initiating temperature of the fluorine-containing polymer powder.

DETAILED DESCRIPTION OF THE INVENTION

Figure 1:
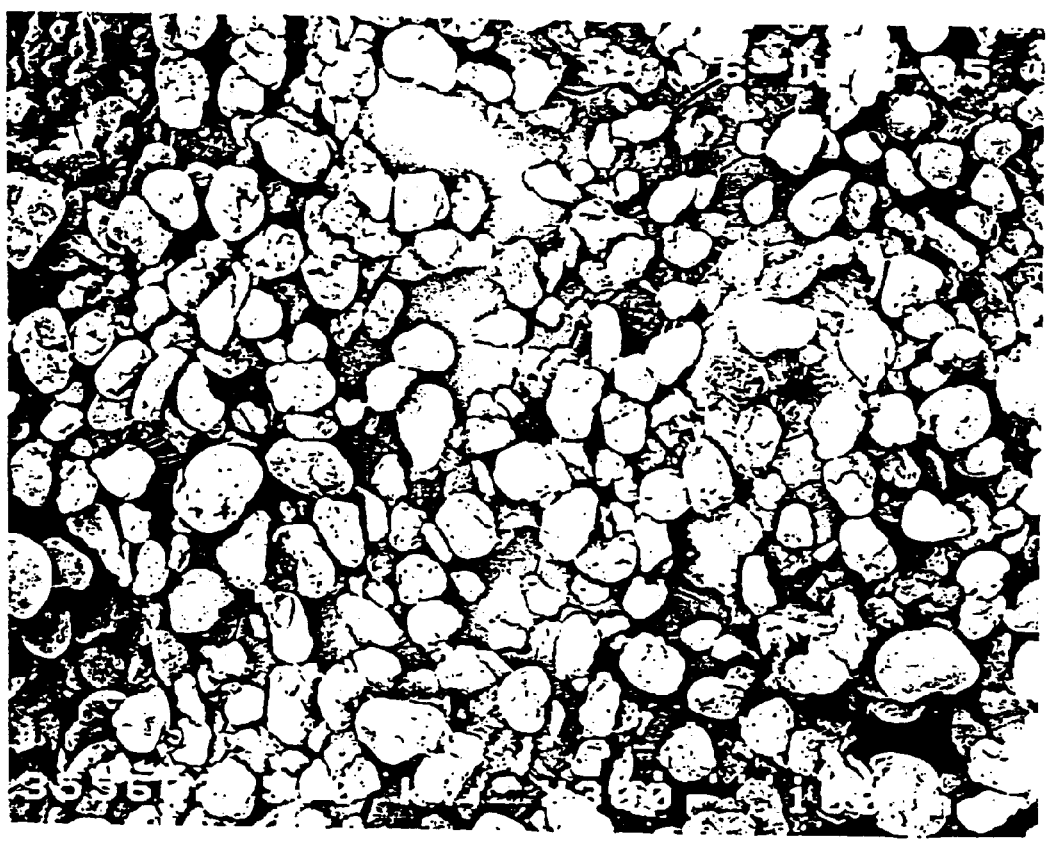
FIG. 1 is a scanning electron microphotograph of fluorine-containing polymer powder obtained in Example 1.

The fluorine-containing polymer raw powder is formed into a sheet by using rolls, and the sheet is compressed under conditions for permitting its specific gravity to achieve at least 90% of the true specific gravity (gravity of the molten molded article). The specific gravity after compression is preferably 95 to 99% of the true specific gravity. If the specific gravity after compression is less than 90% of the true specific gravity, the powder particles obtained after comminution are similar to aggregated fine powder after polymerization and drying, and its apparent density is low and its powder fluidity is poor. Further, if the specific gravity after compression exceeds 99% of the true specific gravity, the resulting particles are heterogeneous in shape similar to powder obtained by pulverizing pellets obtained by cutting an extruded strand from a kneader, and its apparent density is low and its powder fluidity is poor.

Sheet formation by rolls can be conducted such that the thickness of the resulting sheet is 0.05 to 5 mm, preferably 0.1 to 3 mm. The rolls used in the present invention are preferably 2 or more rolls arranged vertically or in the inverted L configuration or Z configuration, and specific examples include calendar rolls, mixing rolls and a roll compactor. For sheet formation by rolls, the fluorine-containing polymer will be subjected to strong shear force at the time of sheet forming, thus allowing the air present in particles of the raw powder to be excluded therefrom to give a uniform sheet.

In the sheet formation, the temperature is 0 to 250° C., preferably 5 to 150° C., and the conditions under which the sheet turns milk-white or transparent are preferably used.

Generally, in the method of comminuting the sheet formed by rolls, the sheet is divided by a crusher into particles having an average diameter of 0.1 mm to 10 mm and then pulverized by a mill or a grinding machine.

Preferably, the sheet is divided through a fixed screen or mesh provided with holes having the size of desired divided particles or through uneven rolls at several stages in the crusher to give particles having an average diameter of 0.1 to 10 mm.

The pulverization is preferably effected by using a mechanical mill. The mechanical mill includes a bombardment type and an attrition type, and those of bombardment type include a cutter mill, a hammer mill, a pin mill and a jet mill, and those of attrition type include a mill using shear force resulting from unevenness by a rotating blade and a peripheral stator. For pulverization, the pulverization type by high shear is preferable because of its superiority in comminution efficiency.

The comminution temperature ranges from −200° C. to 100° C. The temperature for freeze-comminution ranges usually from −200° C. to −100° C. In the present invention, the comminution may be conducted at room temperature (10 to 30° C.). The method of freeze-comminution at a temperature of −200° C. to −100° C. usually in liquid nitrogen requires enormous facilities and high comminution costs in comparison with room-temperature comminution.

The powder particles obtained herein are not such particles of heterogeneous shape as aggregated powder or those obtained by comminuting pellets but are particles having a uniform particle-size distribution. An average particle diameter of these particles is in the range of 5 to 100 μm, and powder particle almost similar in shape to powder particles obtained by freeze-pulverization can be obtained inexpensively.

If the powder pulverized in a high-speed rotating bombardment-type mill, after sheet formation by rolls and division, is subjected to powder coating, there occur the problems of the foaming or uneven surface of the coating at the time of powder coating due to the poor fluidity of the powder because of its broad particle-size distribution and low apparent density.

In the present invention, however, powder pulverized with the high-speed rotating bombardment-type mill is made free of fine particles by air classification and subsequently made free of coarse particles by air classification with a mesh or by a vibrating screen whereby powder for powder paint having high apparent density and improved powder fluidity can be obtained. Classification of the coarse particles is conducted after air classification of the fine particles. If the coarse particles are intended to be removed by air classification with a mesh or by a vibrating screen without removing the fine particles, the fine particles and fibrous particles get caught in the screen to cause clogging to make classification impossible, so powder for powder paint cannot be obtained.

The classification of the fine particles is air classification. In the air classification, the comminuted starting material is sent to a cylindrical classification chamber by air (a blower) under reduced pressure and dispersed by a circulating air in the chamber, and the fine particles are classified by centrifugal force. The fine particles are recovered through a central portion into a cyclone and a bag filter and formed again into a sheet with rolls.

A rotator such as a conical cone, a rotor or the like is set in the classification chamber for uniformly circulating the starting material with air. Control of the classification point in the case of classification cones is conducted by controlling an air flow of secondary air and by controlling a gap between classification cones. In the case of a rotor, the air flow in the classification chamber is controlled by the number of revolutions of the rotor. The blower wind pressure is 1 to 10 kg/cm$^2$, preferably 3 to 6 kg/cm$^2$.

The fine particles are classified in terms of particle size, and the classification range is 3 to 40% by weight, preferably 5 to 30% by weight, and 3 to 40% by weight of the fine particles (including fibrous fine particles) are removed. Removal of less than 3% by weight of the fine particles is not preferable because no improvement in fluidity can be expected, while removal of more than 40% by weight is unsuitable in respect of costs.

Classification of the coarse particles is preferably removal thereof by air classification with a mesh, and the classification range by particle size is 1 to 20% by weight of the whole particle size distribution of the comminuted material, and large particles in said range are removed. The classification range is preferably 2 to 10% by weight.

The fine particles classified and recovered by the air classification machine are formed again into a sheet with rolls in the same manner as for the raw powder, while the coarse particles classified by air classification with a mesh or by a vibrating screen can be recycled by returning them again to the mill.

After the classification, the fluorine-containing polymer powder is contacted instantaneously with air having a temperature which is at least its fusion-initiating temperature in a continuous air stream-type heat-drying machine, whereby the surfaces of the powder particles are made smooth and round and their apparent density and fluidity are further increased to give preferable coating powder.

The contact temperature for continuous air stream-type heat drying is at most 1,000° C. and the contact time is 0.1 to 10 seconds. The heat source is preferably gas heating for the purpose of saving energy, and 200 to 800° C. can be used.

The fluorine-containing polymer powder which was heat-treated in the continuous air stream-type heat-drying machine can further be made free of coarse particles by a vibrating screen or an air stream-type screen to give the coating powder.

The coating powder thus subjected to continuous air stream heat treatment can be coated as an ultra-thin film. The ultra-thin film refers to a film having 5 to 30 μm in thickness. In order to obtain a uniform ultra-thin film having a smooth surface by once applying the coating powder, it is required that the coating powder is particles having uniform diameter and high apparent density and being excellent in fluidity and easily heat-fused.

The average diameter of the coating powder is 5 to 30 μm, preferably 10 to 25 μm. If inconveniences occur in the above item, pin holes occur in the resulting film or its surface becomes orange-like surface.

In order to obtain a thicker film, the continuous air stream-type heat treatment is not required, and the coating powder obtained by the air stream-type classification is used. The thicker film refers to a film having 30 to 100 μm in thickness. In order to obtain an uniform thicker film having a smooth surface by once applying the coating powder, the coating powder preferably has an uniform particle diameter which is an average diameter of 30 to 60 μm.

The method of applying the coating powder includes spraying, electrostatic spraying, fluidization dipping and electrostatic fluidization dipping. The coating powder can also be used as a water-dispersible paint and as an organic solution paint.

The fluorine-containing polymer in the present invention is a fluororesin or a thermoplastic fluororesin excellent in chemical resistance, which may contain a hydroxyl group, an epoxy group, a carboxyl group, etc., in addition to fluorine-containing copolymer. Examples thereof are polyvinylidene fluoride, an ethylene-tetrafluoroethylene copolymer, an ethylene-chlorotrifluoroethylene copolymer, a tetrafluoroethylene-hexafluoropropylene copolymer, a tetrafluoroethylene-perfluoroalkyl vinyl ether copolymer.

The fluorine-containing polymer powder of the present invention can be also used in applications such as home electric appliances, metallic plates for buildings, etc. where weather resistance is required, applications such as rolls in a copying machine, industrial rolls, hoppers, etc. where thermostability is required, applications where abherence is required or applications such as pipes, tanks, etc. in chemical plants where chemical resistance is required.

PREFERRED EMBODIMENTS OF THE INVENTION

Hereinafter, the present invention is described in detail. In Examples and Comparative Examples, various kinds of measurement were conducted in the following manner.

Specific Gravity

The specific gravity of a fluororesin sheet formed by a roller compactor from fluorine-containing copolymer raw powder was determined using an automatic specific gravimeter Denshi Meter D1 (manufactured by Toyo Seiki Co., Ltd.).

Average Particle Diameter

The average particle diameter of the fluorine-containing polymer powder as a suspension in methanol was determined using a laser diffraction scattering-type particle size distribution meter, SALD 1100 (manufactured by Shimadzu Corp.).

Coating Properties

A standard aluminum plate (100 mm×100 mm×1 mm) was subjected to sandblasting treatment with an electrostatic powder coating machine GX3300 type (manufactured by Iwata Tosoh Co., Ltd.), then coated with an about 10-micron film of Polyflon enamel EK-1959 DGN (manufactured by Daikin Industries Ltd.), dried under IR rays, and cooled gradually. Thereafter, the plate was subjected to electrostatic coating of the fluorine-containing resin powder at an applied voltage of 40 kV at room temperature and then calcined to give a coating film of the fluorine-containing resin. Then, its surface roughness $R_a$ ($\mu$m) was determined by a surface roughness measuring machine Surfcom (manufactured by Tokyo Seimitsu Co., Ltd.).

| | |
|---|---|
| $R_a$ is less than 0.7 | ◯◯ |
| $R_a$ is from 0.7 to less than 0.9 | ◯ |
| $R_a$ is at least 0.9 | × |

Film Thickness

The thickness of the film was determined using an electromagnetic film thickness meter SDM-2010 (manufactured by Sanko Denshi Co., Ltd.)

EXAMPLE 1

Tetrafluoroethylene-alkyl vinyl ether copolymer raw powder (PFA raw powder) (having an apparent specific gravity of 0.65, a true specific gravity of 2.15 and an average particle diameter of 350 microns) was compressed into a sheet of 60 mm in width and 5 mm in thickness by means of a roller compactor BCS-25 (manufactured by Shinto Kogyo Co., Ltd.). A specific gravity of the sheet was determined by the specific gravimeter. The specific gravity was 2.1. Then, the divided PFA having a diameter of about 10 mm, which was divided by a crusher attached to the roller compactor, was pulverized at room temperature at 11,000 rpm in a grinding machine Cosmomizer N-1 (manufactured by Nara Kikai Seisakusho Co., Ltd.). Then, fine particles having low apparent density were classified and removed (the amount of removed fine particles: 15% by weight) by a cyclone and a bag filter in an air classification machine, Micron Classifier MC100 (manufactured by Seishin Kigyo Co., Ltd.), and then coarse particles having at least 170 meshes in size (88-micron openings) were removed (the amount of removed coarse particles: 4% by weight) by a classification machine, High Bolder 300SD (manufactured by Shin Tokyo Kikai Co., Ltd.) to give PFA powder. The PFA powder had an average particle diameter of 20 $\mu$m and an apparent density of 0.7 g/ml. A microphotograph of the resulting PFA powder is shown in FIG. 1.

The PFA powder was used to form a coating film. The results of its coating properties and film thickness are shown in Table 1.

EXAMPLE 2

The PFA powder obtained in Example 1 was brought into contact for about 1 second with hot air having 550° C. higher than the fusion-initiating temperature of the PFA powder in a continuous air stream drying machine Flash Jet Dryer (4 inches type) (manufactured by Seishin Kigyo Co., Ltd.).

EXAMPLES 3 AND 4

The same operation as in Example 1 was repeated except that the comminution conditions and classification conditions shown in Table 1 were used.

EXAMPLES 5 AND 6

The same operation as in Example 1 was repeated except that ethylene/tetrafluoroethylene raw powder (ETFE raw powder) (having an apparent density of 0.45, a true specific gravity of 1.73 and an average particle diameter of 50 microns) was used and the comminution conditions and classification conditions shown in Table 1 were used.

COMPARATIVE EXAMPLE 1

After the powder was comminuted at room temperature under the same conditions as in Example 1, fine particles were removed by a vibrating screen of 400 meshes in place of the air classification and course particles were also removed by a screen of 170 meshes.

COMPARATIVE EXAMPLE 2

After the powder was comminuted at room temperature under the same conditions as in Example 1, fine particles were not removed by air classification, and course particles were removed by classification.

COMPARATIVE EXAMPLE 3

After the powder was comminuted at room temperature under the same conditions as in Example 1, fine particles were removed by air classification but course particles were not removed by classification.

COMPARATIVE EXAMPLE 4

The same operation as in Example 2 was repeated except that the specific gravity of the sheet obtained by compression was 1.9 g/cm$^3$ (88% of the true specific gravity).

COMPARATIVE EXAMPLE 5

The same operation as in Example 1 was repeated except that after molten pellets of PFA (apparent specific density: 2.15) were comminuted, fine particles were not removed by air classification. This powder contained a large amount of fibrous powder and further the resulting powder paint was poor in coating properties.

Hereinafter, the results of the Examples and Comparative Examples are shown in Table 1.

TABLE 1

| Measurement items | Examples | | | | | | Comparative Examples | | | | |
| --- | --- | --- | --- | --- | --- | --- | --- | --- | --- | --- | --- |
| | 1 | 2 | 3 | 4 | 5 | 6 | 1 | 2 | 3 | 4 | 5 |
| Type | PFA | PFA | PFA | PFA | ETFE | ETFE | PFA | PFA | PFA | PFA | PFA |
| Specific gravity g/cm$^3$ | 2.1 | 2.1 | 2.1 | 2.1 | 1.65 | 1.65 | 2.1 | 2.1 | 2.1 | 1.9 | 2.15 |
| Pulverization rpm | 11,000 | 11,000 | 8,600 | 6,300 | 7,200 | 6,500 | 11,000 | 11,000 | 11,000 | 11,000 | 11,000 |
| Classification, low, weight % | 15 | 15 | 20 | 8.3 | 9 | 5 | 18 (mesh) | none | 15 | 15 | none |
| Classification, high, weight % | 4 | 4 | 7 | 12 | 5 | 18 | 6 | 11 | none | 4 | clogging |
| Instantaneous drying °C | none | 550 | none | none | none | none | none | none | none | 550 | none |
| Average particle diameter μ | 20 | 19 | 54 | 85 | 48 | 72 | 20 | 20 | 20 | 20 | 35 |
| Apparent density g/ml | 0.7 | 0.8 | 0.75 | 0.85 | 0.63 | 0.67 | 0.5 | 0.5 | 0.7 | 0.6 | 0.3 |
| Coating properties | ○ | ○○ | ○ | ○ | ○ | ○ | × | × | × | × | × |
| Film thickness μ | 30 | 20 | 85 | 150 | 80 | 120 | 20 | 20 | 30 | 30 | 30 |

Fluorine-containing polymer powder used as a powder paint which is excellent in productivity, which is excellent in powder fluidity and which does not generate pollution upon heat fusion can be obtained according to the present invention.

What is claimed is:

1. A process for producing fluorine-containing polymer powder, which comprises densifying fluorine-containing polymer raw powder with rolls under the conditions for permitting its specific gravity to achieve at least 90% of the true specific gravity, then comminuting the densified material, removing fine particles in the range of 3 to 40% by weight of the whole particle size distribution of the comminuted material by air classification, and further removing coarse particles in the range of 1 to 20% by weight of the whole particle size distribution of the comminuted material by classification, wherein an average particle diameter of the fluorine-containing polymer powder is in the range of 5 to 100 μm.

2. A process for producing fluorine-containing polymer powder which comprises densifying fluorine-containing polymer raw powder with rolls under conditions for permitting its specific gravity to achieve at least 90% of the true specific gravity, then comminuting the densified material, removing fine particles in the range of 3 to 40% by weight of the whole particle size distribution of the comminuted material by air classification, further removing coarse particles in the range of 1 to 20% by weight of the whole particle size distribution of the comminuted material by classification, and then conducting heat-treatment at a temperature of not less than the fusion-initiating temperature of the fluorine-containing polymer powder, wherein an average particle diameter of the fluorine-containing polymer powder is in the range of 5 to 100 μm.

3. A process according to claim 1, wherein the comminution is conducted at a temperature ranging from room temperature to 100° C.

4. Fluorine-containing polymer powder obtained by the process according to claim 1.

5. The process according to claim 2, wherein an average particle diameter of the fluorine-containing polymer is in the range of 5 to 100 μm and the comminution is conducted at a temperature ranging from room temperature to 100° C.

6. Fluorine-containing polymer powder obtained by the process according to claim 2.

7. Fluorine-containing polymer powder obtained by the process according to claim 3.

8. Fluorine-containing polymer powder obtained by the process according to claim 5.

9. The process according to claim 1, wherein fine particles removed are in the range of 5 to 30% by weight of the whole particle size distribution of the comminuted material by air classification.

10. The process according to claim 1, wherein coarse particles removed are in the range of 2 to 10% by weight of the whole particle size distribution of the comminuted material by classification.

11. The process according to claim 2, wherein the fine particles removed are in the range of 5 to 30% by weight of the whole particle size distribution of the comminuted material by air classification.

12. The process according to claim 2, wherein the coarse particles removed are in the range of 2 to 10% by weight of the whole particle size distribution of the comminuted material by classification.

* * * * *

UNITED STATES PATENT AND TRADEMARK OFFICE
CERTIFICATE OF CORRECTION

PATENT NO.    : 6,376,647 B1
DATED         : April 23, 2002
INVENTOR(S)   : Tomihashi, Nobuyuki and Miyatani, Toshio It is certified that error appears in the above-identified patent and that said Letters Patent is hereby corrected as shown below:

<u>Title page,</u>
Item [*] Notice, please delete "This patent issued on a continued prosecution application filed under 37 CFR 1.53(d), and is subject to the twenty year patent term provisions of 35 U.S.C. 154(a)(2)."

Signed and Sealed this

Fourteenth Day of January, 2003

JAMES E. ROGAN
*Director of the United States Patent and Trademark Office*